March 29, 1932.  F. L. MORENO ET AL  1,851,640
RESILIENT WHEEL
Original Filed Sept. 10, 1927   2 Sheets-Sheet 1
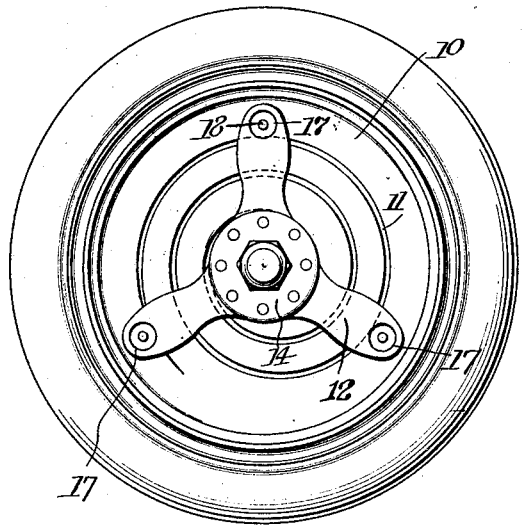
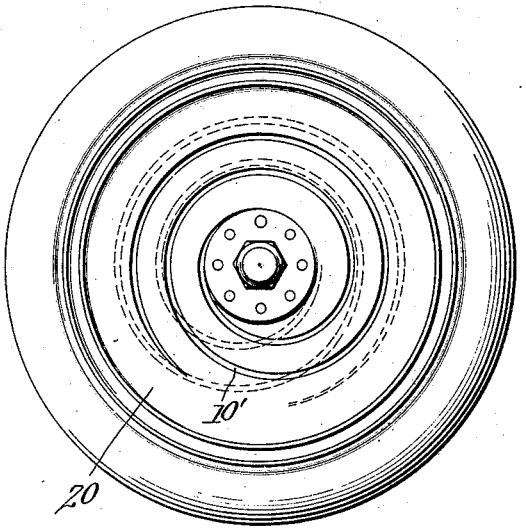
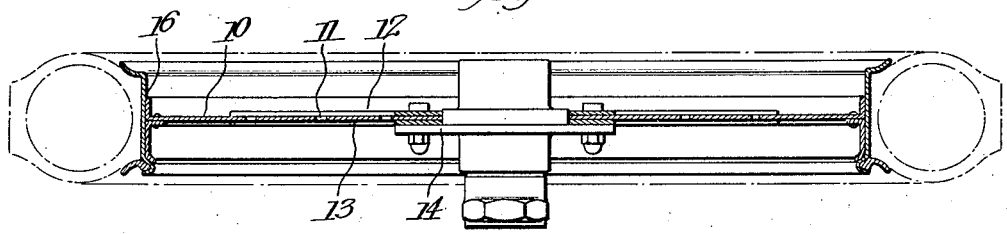
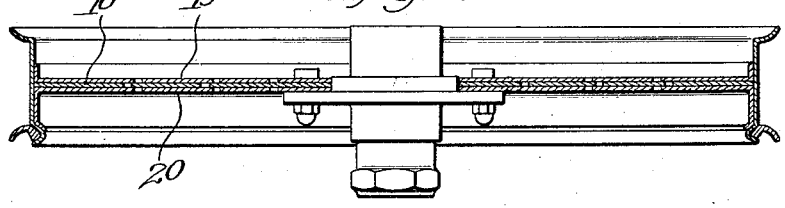
Inventors
Froilan Labbe Moreno,
Roberto Gleisner Vera,
By Cushman Byrant & Darby
Attorneys March 29, 1932.   F. L. MORENO ET AL   1,851,640
RESILIENT WHEEL
Original Filed Sept. 10, 1927   2 Sheets-Sheet 2

Inventors
Froilan Labbé Moreno
Roberto Gleisner Vera

Patented Mar. 29, 1932

1,851,640

UNITED STATES PATENT OFFICE

FROILAN LABBÉ MORENO AND ROBERTO GLEISNER VERA, OF SANTIAGO, CHILE

RESILIENT WHEEL

Application filed September 10, 1927, Serial No. 218,740. Renewed January 16, 1932.

The present invention relates to wheels of the type provided with resilient webs, whereby movements of the wheel hub relative to the felly are permitted. The invention may take various forms, and several embodiments are shown in the accompanying drawings, wherein Figure 1 is a side plan view of a wheel embodying our invention.

Figure 2 is a side plan view of a wheel provided with our novel structure in a second form.

Figure 3 is a horizontal diametrical section of Fig. 1.

Figure 4 is a diametrical section of Fig. 2.

Figure 5:
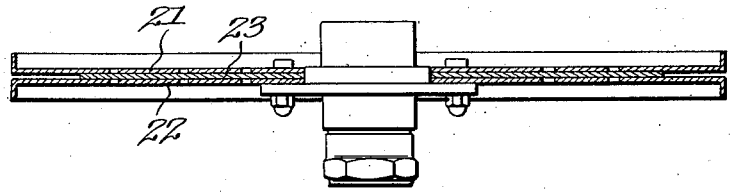
Figure 5 is a diametrical section through a wheel embodying our invention in still another form.

Generally speaking, our invention consists in the provision of a wheel web composed of one or more resilient disks suitably apertured so as to permit resilient movements of its center portion relative to its rim portion. The disk or disks, of which the web is composed, may be composed of any suitable material, preferably spring steel. Preferably, and as shown in all the figures of the drawings, a suitable perforation consists of a spiral slot generated about the rotational axis of the disk. In Figs. 1 and 3, 10 indicates the disk and 11 the spiral slot therein. In using such a web in a vehicle wheel, there would be a tendency under certain conditions for the center portion of the disk to be forced out of the plane of the rim portion, and consequently means must be provided to take care of such lateral stresses. In Figs. 1 and 3, this means is shown to be a pair of spiders 12 and 13, one at each side of disk 10, the spiders and disk 10 being secured at their centers to hub flange 14 by means of bolts 15. The ends of the spider arms extend substantially beyond the outer peripheral limits of slot 11 so as to bear against the rigid rim portion of the disk at all times. In this manner, all portions of disk 10 are always kept in the same plane. The described elements are so proportioned, however, that radial movements of the hub relative to felly 16 will never cause the arms of the spiders to abut the felly.

If the described web is to be used on a traction wheel, it is desirable to provide means to limit possible rotation of the spiders relative to disk 10. Consequently, as clearly, shown in Figure 1, we provide the arms of the spiders with enlarged apertures 17 in their ends, and pins 18 fixed to the solid rim portion of disk 10 normally extend into the center of these apertures. Abutment of these pins with the walls of the respective apertures will effectively limit rotation of the spiders relative to the intermediate disk. The size of the apertures relative to that of the pins is such that radial contractions and expansions of the disk are not hindered.

Slot 11 is preferably in the form of an Archimedean spiral, and it will be noted that the bounding walls of the spiral converge at both ends of the latter.

Instead of using a spider with solid arms to prevent distortion of the slotted disk due to lateral strains, we may provide several slotted disks side by side as shown in Figs. 2 and 4. According to these figures, spiders 12 and 13 are replaced by additional slotted disks 19 and 20, one at each side of a main slotted disk 10'. In this modification the spirals of disks 19 and 20 preferably run in the opposite direction to the spiral of disk 10', that is, if the latter is right hand, the former are both left hand. Furthermore, the pitch of the spiral slots in the outer disks differs from that of the inner disk so that the slots of the three disks will have the least possible coincidence. While we have shown three disks in the figures just referred to, it is, of course, apparent that the web may comprise any desired number.

According to Fig. 5, the web consists of two spaced spirally slotted disks 21 and 22, and an intermediate solid disk 23 of sufficient diameter to extend well within the solid rim portion of each outer disk, and yet permit adequate radial movement of the hub toward the felly. The center portions of the three disks are all rigidly secured to a hub element.

Figure 7:
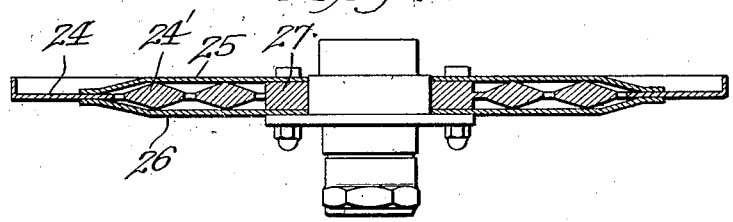
Figure 7 is a diametrical section through a wheel embodying our invention in substantially the form shown in Fig. 1, but with certain modifications.
Figure 8:
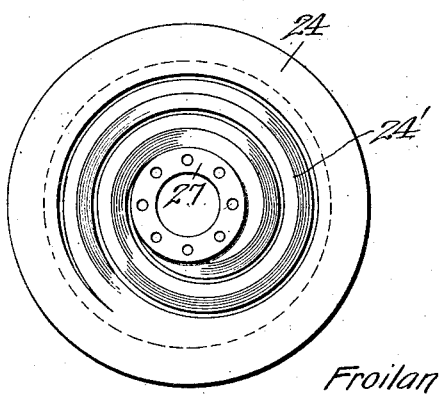
Figure 8 is a side plan view of a wheel according to Fig. 7 with a part removed.

For heavy duty, the web may be composed of a sufficiently massive single disk, or an adequate number of single disks. The single disk structure may be modified, as illustrated in Fig. 7, wherein it will be seen that spiral convolutions 24' of disk 24 are considerably thickened, and as here shown, are substantially diamond shape in cross section. As means for preventing distortion of the convolutions from normal uniplanar relation, we provide in this modification cupped rigid plates 25 and 26 rigidly secured at either side of an enlarged central portion 27 of the disk. In Fig. 8, plate 25 has been removed to expose the convolutions.

Figure 6:
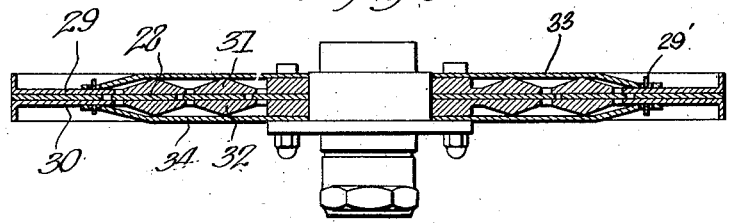
Figure 6 is a diametrical section through a wheel embodying a further modified form.

Fig. 6 illustrates the use of a central planefaced disk or plate 28 of the same design as disk 10 of Fig. 1, and two outer slotted disks 29 and 30 whose convolutions are outwardly expanded to give them a substantially triangular cross section as at 31 and 32. The slots of discs 29 and 30 are of different pitch from that of disc 28, and run in the opposite direction thereto. As indicated in this figure, the oppositely running slots all start at the left of the hub. Here, as in Figure 7, stiffening means in the form of cupped plates 33 and 34 are provided, the disks and plates being rigidly secured together at their center portions. The wheel may be made more effective for traction purposes by providing the margins of plates 33 and 34 with apertures overlying the solid marginal portions of discs 29 and 30, and pins, as at 29', may be secured to the latter in position to project through the apertures, the result being the same as described in connection with Figure 1.

While we have necessarily shown and described specific embodiments of our invention, it is clear that many different combinations of elements may be secured without departing from the spirit of our invention. Accordingly, we do not intend to confine ourselves except as determined in the following claims.

We claim:

1. A wheel disk of resilient material, said disk having a single spiral slot generated about its rotational axis whereby radial movements of the center portion of the disk relative to the rim portion are permitted, the width of the material between adjacent convolutions of the slot being materially greater than the normal width of the slot.

2. A wheel web comprising a plurality of coaxially disposed resilient disks, each of said disks having a spiral slot generated about the common axis whereby radial movements of the center portions of the disks relative to their rim portions are permitted, the slots of adjacent disks being of different pitch.

3. A wheel disk of resilient material, said disk having a single spiral slot generated about its rotational axis whereby radial movements of the center portion of the disk relative to the rim portion are permitted, said slot being tapered toward its ends, the width of the material between adjacent convolutions of the slot being materially greater than the normal width of the slot.

4. A wheel disk of resilient material, said disk having a single spiral slot generated about its rotational axis to form spring convolutions intermediate its center portion and rim portion, the width of the material between adjacent convolutions of the slot being materially greater than the normal width of the slot.

5. A wheel disk of resilient material, said disk having a spiral slot generated about its rotational axis to form spring convolutions intermediate its center portion and rim portion, said convolutions being laterally expanded.

6. A wheel disk of resilient material, said disk having a spiral slot generated about its rotational axis to form spring convolutions intermediate its center portion and rim portion, said convolutions having an integral outwardly tapered lateral extension.

7. A wheel disk of resilient material, said disk having a spiral slot generated about its rotational axis to form spring convolutions intermediate its center portion and rim portion, said convolutions being laterally expanded at both sides.

8. A wheel web comprising a plurality of resilient co-axially disposed disks, said disks each having a spiral slot generated about the common axis to form spring convolutions intermediate its center portion and rim portion, and a plate intermediate said disks and rigidly secured to one of said portions of the disks, said plate overlapping the other of said portions of the disks whereby distortion of the disks from their normal planes are substantially prevented while radial distortions are permitted.

9. A wheel comprising a felly, a hub, and a web composed of a plurality of resilient coaxially disposed disks, said disks each having a spiral slot generated about the common axis to form spring convolutions intermediate its center portion and rim portion, said portions being respectively secured to said hub and felly, and a plate rigidly secured to said hub element intermediate said disks and extending between the rim portions of the latter to prevent distortions of the disks from their normal planes while permitting radial distortions of the disks.

10. A traction wheel comprising a resilient disk, said disk having a spiral slot generated about its rotational axis whereby spring convolutions are formed intermediate its center portion and rim portion, a driving hub secured to said center portion, a rigid radially-extending element secured to said hub, and a lost motion connection between said rigid element and said rim portion whereby relative rotation of said center and rim portions is limited.

In testimony whereof we have hereunto set our hands.

F. LABBÉ MORENO.
Dr. R. GLEISNER VERA.